United States Patent
Nojiri (10) Patent No.: US 9,558,699 B2
(45) Date of Patent: Jan. 31, 2017

(54) LIQUID CRYSTAL DISPLAY AND DRIVING METHOD OF THE SAME

(71) Applicant: MITSUBISHI ELECTRIC CORPORATION, Tokyo (JP)

(72) Inventor: Isao Nojiri, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 165 days.

(21) Appl. No.: 14/643,415

(22) Filed: Mar. 10, 2015

(65) Prior Publication Data

US 2015/0277195 A1   Oct. 1, 2015

(30) Foreign Application Priority Data

Mar. 25, 2014   (JP) ................................ 2014-061750

(51) Int. Cl.
*G06F 3/038* (2013.01)
*G09G 3/36* (2006.01)
*G02F 1/1343* (2006.01)

(52) U.S. Cl.
CPC . *G09G 3/3614* (2013.01); *G02F 2001/134372* (2013.01)

(58) Field of Classification Search
CPC combination set(s) only.
See application file for complete search history.

(56) References Cited

U.S. PATENT DOCUMENTS

2010/0201679 A1* 8/2010 Yoshii ................. G09G 3/3655
345/214

FOREIGN PATENT DOCUMENTS

JP   2010-169994 A   8/2010
JP   2010-256547 A   11/2010

* cited by examiner

*Primary Examiner* — Van Chow
(74) *Attorney, Agent, or Firm* — Studebaker & Brackett PC (57) ABSTRACT

A lateral electric field type liquid crystal display includes: an array substrate that includes: a plurality of signal lines and a plurality of scan lines arranged in a matrix to form pixel areas; and a common electrode formed to face pixel electrodes with interposing an insulating film; a counter substrate that faces the array substrate; and a liquid crystal material that is interposed between the array substrate and the counter substrate, wherein the liquid crystal material responds to an electric field parallel to a surface of the array substrate, and wherein in a vertical blanking period, which is a blanking period of a vertical period for sequentially applying scan signals to all of the scan lines, a common electrode potential is changed so that a potential difference between the common electrode potential and the pixel electrode potential becomes smaller than that before the vertical blanking period.

8 Claims, 5 Drawing Sheets

LIQUID CRYSTAL DISPLAY AND DRIVING METHOD OF THE SAME

CROSS-REFERENCE TO RELATED APPLICATION

This application claims priority from Japanese Patent Application No. 2014-061750 filed on Mar. 25, 2014, the entire subject matter of which is incorporated herein by reference.

TECHNICAL FIELD

This disclosure relates to a lateral electric field type active-matrix liquid crystal display, and more specifically, to a lateral electric field type active-matrix liquid crystal display capable of removing a pressure mark which is an orientation defect caused by applying a pressure to a display surface, in a short time.

BACKGROUND

A lateral electric field type liquid crystal displays includes a pair of electrodes that is formed on the same substrate, and a liquid crystal material that responds to an electric field which is generated between the electrodes, almost in parallel to a surface of the substrate. This display has very wide viewing angles and is widely being used not only in television sets and monitors but also in displays for mobile devices.

In this kind of a lateral electric field type liquid crystal display, a liquid crystal material is oriented in parallel to a substrate surface and in the same direction. This orientation state is generally called uniaxial orientation. In the lateral electric field type liquid crystal display, in a state where the liquid crystal material is uniaxially oriented, when an electric field almost parallel to the substrate surface is applied, the orientation of the liquid crystal material is changed. As a result, display is performed. In general, a state where the liquid crystal material has responded to an electric field is referred to as white display, and a state where the liquid crystal material has not responded to an electric field is referred to as black display.

In the lateral electric field type liquid crystal display, especially, during white display, if a pressure is applied to the display surface, an orientation abnormality of the liquid crystal material occurs around the pressed position, and even after the pressure is removed, the orientation abnormality remains as a visible display defect for a long time. This display defect is called as a pressure mark. With respect to this pressure mark, there have been proposed configurations for changing the shapes of pixel electrodes, thereby suppressing occurrence of pressure marks (for example, Japanese Patent Application Laid-Open Nos. 2010-169994 and 2010-256547).

However, since the shapes of pixel electrodes for suppressing occurrence of pressure marks have protrusions or the like, each of which is formed at a portion between a pair of electrodes for generating an electric field almost in parallel to a substrate surface and changes the response direction of a liquid crystal material, an aperture ratio decreases and thus it is difficult to obtain sufficiently bright display.

SUMMARY

This disclosure is to provide a liquid crystal display, which is excellent in display and is capable of removing a pressure mark that is generated in a case where a pressure is applied to a display surface, in a short time after the pressure is removed.

A lateral electric field type liquid crystal display includes: an array substrate that includes: a plurality of signal lines and a plurality of scan lines arranged in a matrix to form pixel areas; switching elements formed corresponding to the intersections of the signal lines and the scan lines; pixel electrodes connected to the switching elements, and a common electrode formed to face the pixel electrodes with interposing an insulating film; a counter substrate that faces the array substrate; and a liquid crystal material that is interposed between the array substrate and the counter substrate, wherein the liquid crystal material responds to an electric field parallel to a surface of the array substrate, and wherein in a vertical blanking period, which is a blanking period of a vertical period for sequentially applying scan signals to all of the scan lines, a common electrode potential is changed so that a potential difference between the common electrode potential and the pixel electrode potential becomes smaller than that before the vertical blanking period.

According to this disclosure, it is possible to obtain a liquid crystal display, which is excellent in display and is capable of changing the potential of a common electrode in a vertical blanking period, which is a blanking period of a vertical period for sequentially applying a scan signal to all scan lines, thereby capable of removing a pressure mark remaining on a display surface, in a short time.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 1:
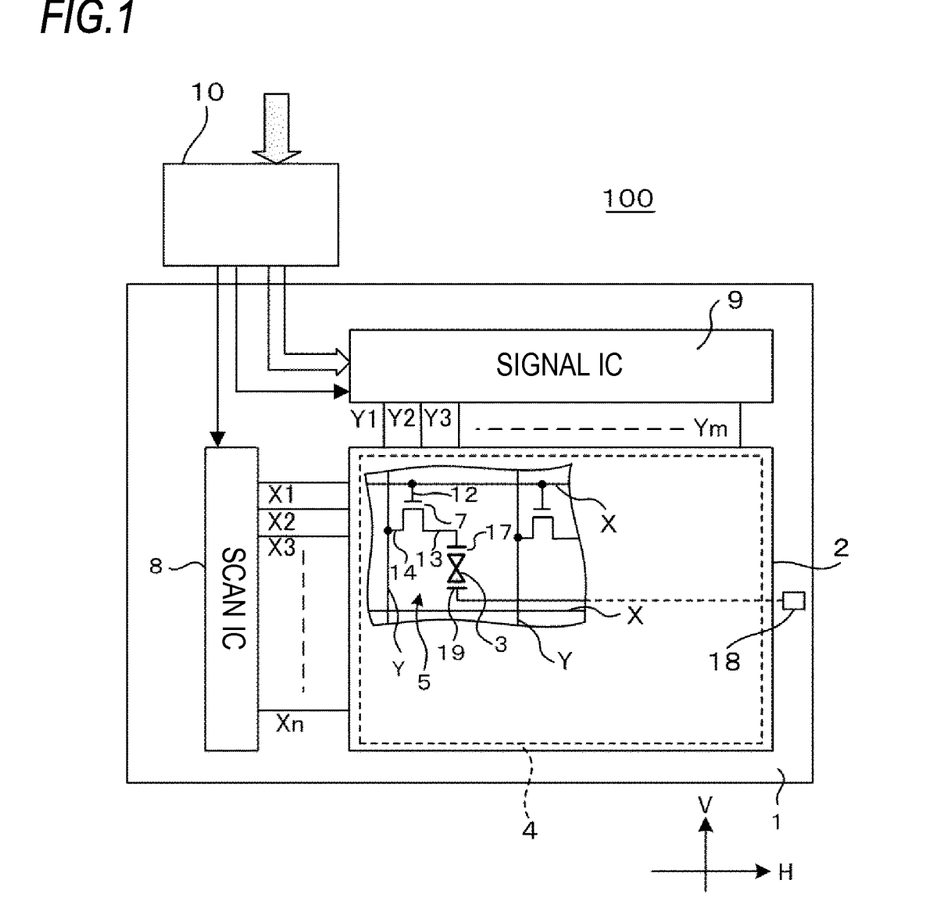
FIG. 1 is a configuration diagram illustrating a liquid crystal display according to a first embodiment of this disclosure.
Figure 2:
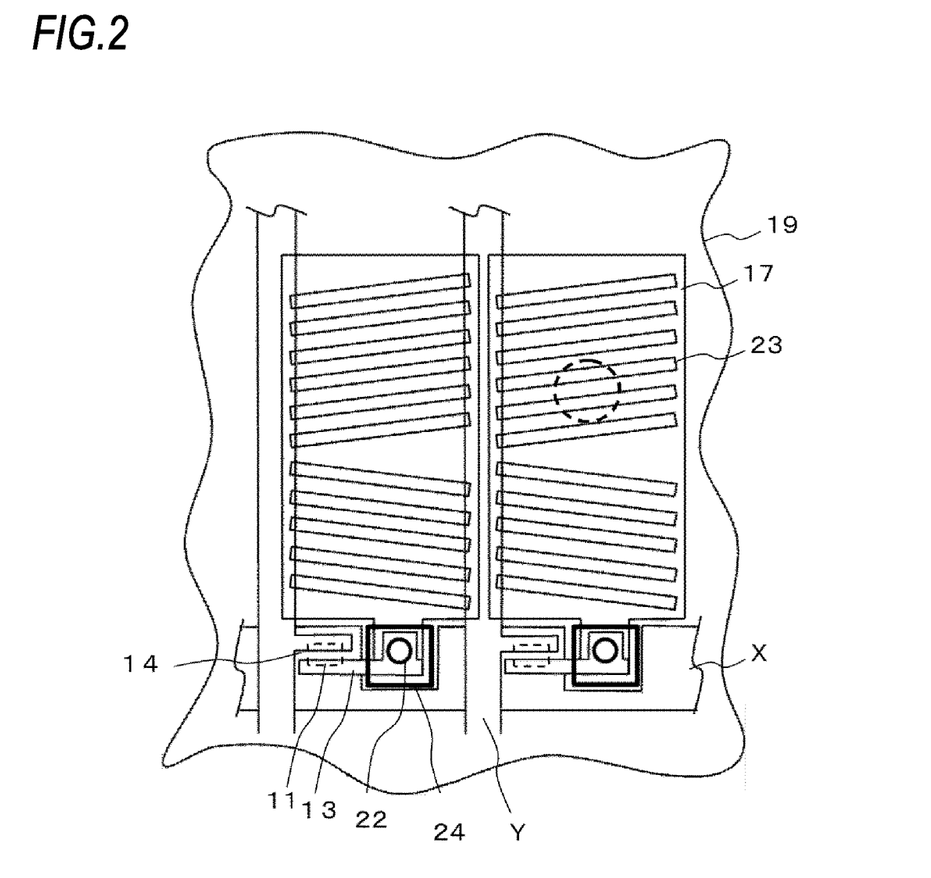
FIG. 2 is an enlarged plan view illustrating a pixel portion of the liquid crystal display according to the first embodiment of this disclosure.
Figure 3:
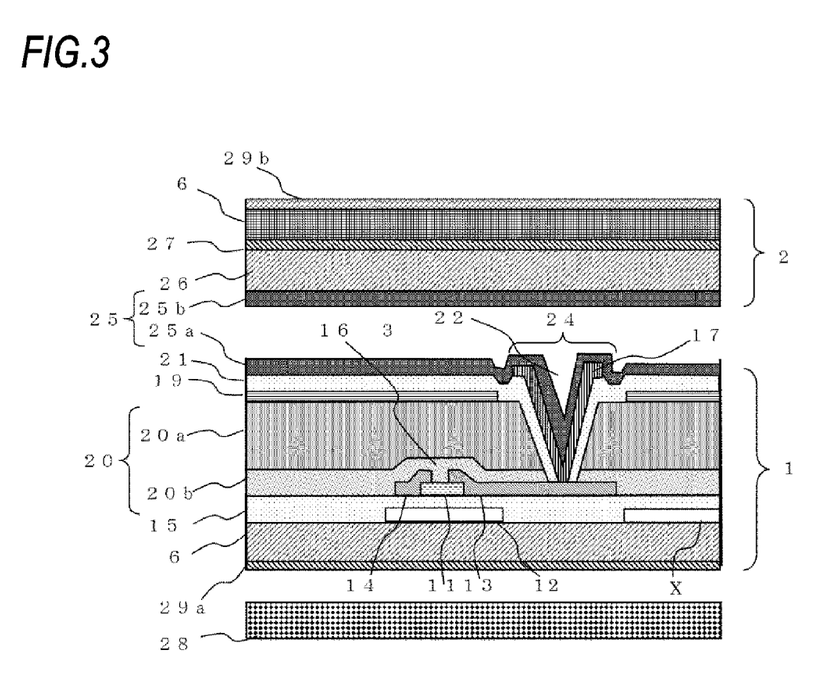
FIG. 3 is an enlarged cross-sectional view illustrating a pixel portion of the liquid crystal display according to the first embodiment of this disclosure.

<Structure of Liquid Crystal Display>
The structure of a liquid crystal display according to a first embodiment of this disclosure will be described with reference to FIGS. 1 to 3. FIG. 1 shows the configuration of the liquid crystal display including a liquid crystal display element, a driving circuit, and a control circuit. FIG. 2 is an enlarged view illustrating a pixel portion of the liquid crystal display, and FIG. 3 is an enlarged cross-sectional view illustrating a thin film transistor (TFT) which is included as a switching element in the pixel portion of the liquid crystal display, and the surrounding area of the TFT. This display device will be characterized by at least a drive signal. The structure of the liquid crystal display is first described, and then the drive signal will be described in detail during description of a drive condition.

In description and drawings of an embodiment, identical or equivalent parts are denoted by the same reference symbols.

A liquid crystal display 100 mainly includes a liquid crystal display element that is composed of an array substrate 1, a counter substrate 2, and a liquid crystal material 3 interposed therebetween, and peripheral circuits. An image display portion of the liquid crystal display element is referred to as a display area 4 and is composed by a plurality of pixels 5 arranged in an m-by-n matrix (wherein m and n are positive integers).

The array substrate 1 is an insulating substrate 6 having a light transmitting property, such as a glass substrate or a quartz substrate. On the insulating substrate 6, n number of scan (gate) lines X (X1 to Xn) are formed so as to extend along a row direction H, and m number of signal (source) lines Y (Y1 to Ym) are formed so as to extend along a column direction V. Areas surrounded by the scan lines X and the signal lines Y correspond to the pixels 5 respectively, and at intersections of the scan lines X and the signal lines Y, switching elements 7 are formed, respectively.

The scan lines X1 to Xn and the signal lines Y1 to Ym are connected to a control unit 10 through a scan IC 8 and a signal IC 9 formed on the periphery of the array substrate 1, respectively. The scan lines X and the signal lines Y can use a conductive material such as molybdenum, aluminum, tungsten, or titanium. The switching elements 7 can be composed of thin film transistors (TFTs), and semiconductor layers 11 of the switching elements 7 can use polysilicon, amorphous silicon, or the like. In the present embodiment, amorphous silicon is used.

A window portion shown inside the liquid crystal display 100 of FIG. 1 enlargedly shows a portion of the array substrate 1 including a pixel 5. Each switching element 7 includes a scan electrode 12 which is electrically connected to a corresponding scan line X. The scan lines X and the scan electrodes 12 can be formed of the same material in the same process. As shown in FIG. 3, the scan lines X and the scan electrodes 12 are covered by a gate insulating film 15 formed of an inorganic material such as silicon nitride (SiN).

The signal lines Y are formed on the gate insulating film 15. Also, the semiconductor layers 11 of the switching elements 7 are formed on the gate insulating film 15 so as to face the scan electrodes 12 with the gate insulating film 15 interposed therebetween.

Each switching element 7 includes a signal electrode 14 and a drain electrode 13 which are disposed so as to be in contact with the semiconductor layer 11, and a portion between the signal electrode 14 and the drain electrode 13 serves as a channel 16. Each signal electrode 14 is connected to a corresponding signal line Y, and each drain electrode 13 is connected to a corresponding pixel electrode 17. If a voltage is applied between a pixel electrode 17 and a common electrode 19 connected to a common wire 18, the liquid crystal material 3 of a corresponding pixel performs a response operation.

The signal electrodes 14, the signal lines Y, and the drain electrodes 13 can be formed of the same material at the same time. The semiconductor layers 11, the signal lines Y, the signal electrodes 14, and the drain electrodes 13 are covered by a first insulating film 20 (FIG. 3). The first insulating film 20 serves as a passivation film, and can be formed by any one of a silicon nitride (SiN) film, a silicon oxide (SiO) film, and an organic insulating film, or a laminated film of two or more of them. In the present embodiment, the first insulating film 20 is a laminated film of a silicon nitride film 20a and an organic insulating film 20b.

In the present embodiment, as each switching element 7, a bottom gate type thin film transistor having a structure in which the scan electrode 12 is located on the lower side (on the insulating substrate (6) side) and the channel 16 is located on the upper side (the liquid crystal material (3) side) is used.

As shown in FIGS. 2 and 3, the common electrode 19 is formed over the entire display area on the first insulating film 20, and a second insulating film 21 is formed so as to cover the common electrode 19. Also, on the second insulating film 21, the pixel electrodes 17 of the pixels are formed so as to be connected to the drain electrodes 13 of the respective pixels via contact holes 22 (openings 24).

In a pixel electrode 17, a plurality of slits 23 is formed (FIG. 2). Since the slits 23 are formed, in a case of applying a voltage between the common electrode 19 and the pixel electrode 17, at the end portions of the slits 23, an electric field is generated almost in parallel to a surface of the array substrate 1, whereby the liquid crystal material 3 can respond in a horizontal direction. In the present embodiment, the slits 23 are formed in a rectangular shape. However, even if the slits are formed in any other shape such as an elliptical shape, it is possible to obtain the same effect.

All of the common electrode 19 and the pixel electrodes 17 can be formed of a conductive material having a light transmitting property, such as ITO or IZO. Also, on the pixel electrodes 17, a film is formed and a liquid crystal orientation process is performed on that firm in a direction for orientating the liquid crystal material 3, whereby an orientation film 25a is formed.

Meanwhile, the counter substrate 2 is formed by using an insulating substrate 6 having a light transmitting property, such as a glass substrate or a quartz substrate. As shown in FIG. 3, the counter substrate 2 includes a black matrix 27 and a color filter layer 26 which are formed on a surface of the insulating substrate 6 positioned on the liquid crystal material (3) side. In order to planarize unevenness of the surface of the color filter layer 26, an overcoat layer can be formed.

The black matrix 27 is formed at positions on the insulating substrate 6 corresponding to the scan lines X, the signal lines Y, the switching elements 7, and the like formed on the array substrate 1. The black matrix 27 can be formed of a resin colored with black as an example. Also, the color filter layer 26 is disposed on the insulating substrate 6, and is formed of a resin layer colored with so-called three primary colors of red, yellow, and blue.

On the surfaces of the array substrate 1 and the counter substrate 2, orientation films 25a and 25b are formed, respectively. The orientation films 25a and 25b needs only to be able to uniformly orient the liquid crystal material 3, and in many cases, polyimide films subjected to a rubbing process for orienting the liquid crystal material 3 are used. In the present embodiment, a rubbing process is performed in the left-right direction (H direction) of FIG. 2.

After the orientation films 25a and 25b are formed, the array substrate 1 and the counter substrate 2 are attached with the liquid crystal material 3 interposed therebetween. In this state, the liquid crystal material 3 is oriented in the left-right direction (H direction) of FIGS. 1 and 2. Further, polarizing plates 29a and 29b are attached to the front surface and the rear surface such that their transmission axes become parallel to and perpendicular to the liquid crystal orientation, respectively. As a result, the liquid crystal display 100 is obtained. In the liquid crystal display 100, in a state where a voltage is not applied between the common electrode 19 and a pixel electrode 17, a corresponding pixel performs black display. If a voltage is applied, the liquid crystal material 3 responds in the electric field direction, whereby the corresponding pixel performs white display.

<Driving of Liquid Crystal Display>

As shown in FIG. 1, the control unit 10 is connected to the scan IC 8 and the signal IC 9, and is connected to the scan (gate) lines X1 to Xn and the signal (source) lines Y1 to Ym. A common voltage is applied from the common wire 18 to the common electrode 19.

According to information from an external input device such as a personal computer, the control unit 10 outputs digital display data (for example, signals corresponding to red, green, and blue) and various control signals to the individual ICs. On the basis of the control signals and the display data from the control unit 10, the individual ICs output scan signals and display signals to the scan lines X and the signal lines Y, respectively. Main control signals to the scan IC 8 include a vertical synchronization signal, a start pulse signal, a clock signal for the signal IC, and so on.

Further, the control unit 10 outputs a gradation voltage generated by a reference voltage, to the signal IC 9. After the signal IC 9 receives the display data, if a horizontal synchronization signal is output from the control unit 10, in sync with the horizontal synchronization signal, the signal IC 9 converts the input display data to analog display signals, and applies the analog display signals to the signal lines Y.

On the basis of the control signals of the control unit 10, the scan IC 8 sequentially supplies a scan (gate) signal to the n number of scan lines X1 to Xn. Also, the signal IC 9 supplies video signals to the m number of signal lines Y1 to Ym, respectively at a timing when switching elements 7 of each row are turned on by a scan signal.

The switching elements 7 are composed of thin film transistors each having a scan electrode 12, a drain electrode 13, and a signal electrode 14. Each drain electrode 13 is connected to a corresponding pixel electrode 17. On the switching elements 7, the common electrode 19 is formed with the second insulating film 21 interposed therebetween.

If a scan signal is applied to the scan electrode 12 of a switching element 7, the switching element 7 is turned on, a voltage applied to a corresponding signal line Y is applied to a corresponding pixel electrode 17 through the signal electrode 14 and the drain electrode 13, whereby a voltage is applied to the liquid crystal material 3. If a voltage which is applied to a pixel electrode 17 through a signal line Y is denoted by Vs, and the common potential of the common electrode is denoted by Vcom, a difference |Vs−Vcom| between the voltage of the pixel electrode and the common potential is applied to the liquid crystal material 3.

The scan signal is applied to the plurality of scan lines X by sequentially scanning from upper end. If the scan signals are applied and corresponding switching elements 7 are turned on, the display signals of the signal lines Y are sequentially supplied, in sync with scanning of each scan line X. That is, if a scan signal is applied to any one scan line X, switching elements 7 connected to the corresponding scan line X are turned on, and the display signal applied to the signal lines are applied to the signal electrodes 14 of the switching elements 7, respectively, whereby voltages are applied to the liquid crystal material 3

As described above, a period in which the scan signals are sequentially applied to all scan lines X is referred to as a vertical period (or vertical scan period). A general liquid crystal display has a vertical scan period of 1/60 seconds (a vertical frequency of 60 Hz). That is, for 1/60 seconds, all scan lines X are sequentially scanned, whereby voltages are applied to all pixel electrodes. If the scan signals are sequentially applied to all scan lines X, one vertical period finishes. Thereafter, a scan signal is not applied to any scan line X until the next vertical period starts. This period is referred to as a vertical blanking period. Also, in a case where the scan signals are sequentially applied to the scan lines X, a period from when a scan signal is applied to any scan line X to when a scan signal is applied to the next scan line X is referred to as a horizontal blanking period.

The frequency of horizontal scanning is the product of the vertical frequency and the number of scan lines. Therefore, if blanking periods are ignored, a write time assigned to one scan line X is obtained by dividing 1/60 (sec) by the number of scan lines (which is about 500 to 1000 in a general liquid crystal display). In the write time assigned to one scan line X, a pixel potential Vs is written in each pixel electrode connected to the corresponding scan line. Scanning is performed from the scan line X1 to the scan line Xn in a vertical period of 1/60 seconds, whereby an image is rewritten. When scanning on the scan line at the lower end finishes, scanning can be repeated from the upper end, whereby it is possible to perform display.

<Description of Pressure Mark>

Figure 4A:
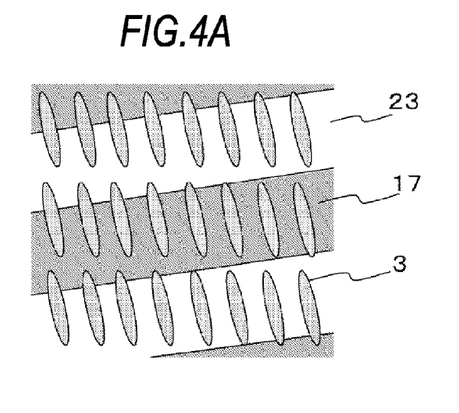
FIGS. 4A and 4B are enlarged schematic diagrams for explaining a pressure mark according to the first embodiment of this disclosure.
Figure 4B:
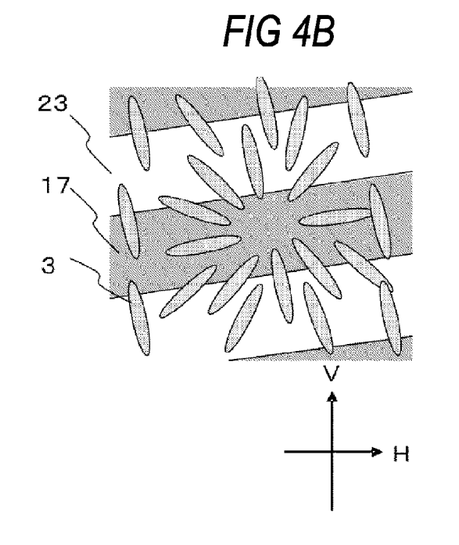

A pressure mark which should be solved by this disclosure will be described with reference to FIGS. 4A and 4B. FIGS. 4A and 4B are enlarged views schematically illustrating the orientation state of the liquid crystal material 3 interposed between the counter substrate 2 and the array substrate 1, in a portion surrounded by a broken line circle of FIG. 2. FIG. 4A shows a state where a voltage has been applied between a pixel electrode 17 and the common electrode 19 through the slits 23, and FIG. 4B schematically shows the orientation state of the liquid crystal material during occurrence of a pressure mark. Also, in FIG. 4A and 4B, elliptical shapes represent the liquid crystal material 3.

On the front surface and rear surface of the display area 4, the polarizing plates are attached such that their transmission axes become a horizontal (H) direction and a vertical (V) direction, respectively. Therefore, in a state where any voltage is not being applied, the liquid crystal material 3 is oriented in the horizontal (H) direction. If a voltage is applied between the pixel electrode 17 and the common electrode 19, the liquid crystal material 3 is oriented in a direction perpendicular to the boundary lines of the slits 23 as shown in FIG. 4A. In this state, excellent white display is performed, and when any voltage is not being applied, it is possible to obtain excellent black display.

If a high pressure is applied to the display area 4 by a finger or the like, the counter substrate 2 positioned on the front surface becomes slightly hollow, whereby the volume of the liquid crystal material 3 interposed between the counter substrate 2 and the array substrate 1 decreases. At this time, the liquid crystal material flows radially from the pressed portion. Therefore, it can be estimated that the liquid crystal material 3 is oriented in a radial direction from the pressed portion (FIG. 4B). The radial orientation abnormality is visible as a display defect for a long time even after the pressure is removed, and a pressure mark is a display abnormality which is caused by the liquid crystal material 3 oriented in various directions as shown in FIG. 4B.

This pressure mark is removed if being neglected for a long time. However, in the meantime, the pressure mark is visible as a display defect. For this reason, it is necessary to remove the pressure mark in a short time. According to this disclosure, a drive waveform is changed in a range in which normal display is maintained and display is not affected, whereby a pressure mark is removed in a short time. A drive waveform which is used in the present embodiment will be described below in detail.

<Timing Chart of Liquid Crystal Display>

Figure 5:
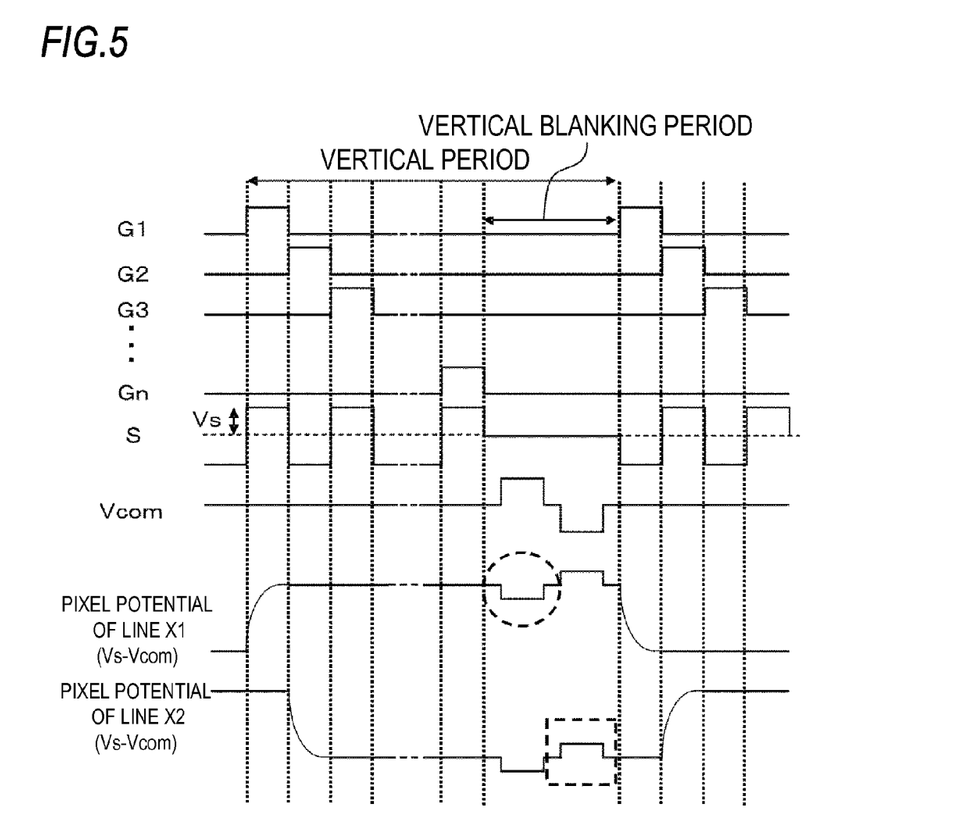
FIG. 5 is a write timing chart of the liquid crystal display according to the first embodiment of this disclosure.
Figure 6:
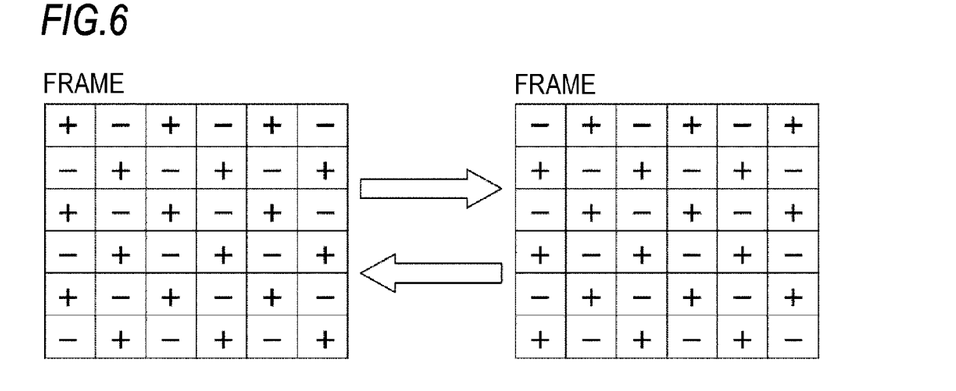
FIG. 6 is a view illustrating write polarities of the liquid crystal display according to the first embodiment of this disclosure.

A driving method of the liquid crystal display of this disclosure will be described with reference to FIG. 5. FIG. 5 is a timing chart illustrating scan signals, a common electrode potential, and the like which are in a liquid crystal driving method according to the first embodiment of this disclosure. In the present embodiment, dot inversion driving is used for driving liquid crystal of neighboring pixels 5 with different polarities. FIG. 6 shows polarity inversion states according to dot inversion driving. In FIG. 6, the symbols "+" or "−" shown in frames represents positive polarity or negative polarity with which writing on a corresponding pixel 5 has been performed, and positive polarity means a state where the potential Vs of a corresponding pixel electrode 17 is higher than a common electrode potential Vcom, and negative polarity means a state where the potential Vs of a corresponding pixel electrode 17 is lower than the common electrode potential Vcom.

As shown in FIG. 6, not only in the horizontal direction (H direction) but also in the vertical direction (V direction), the symbols "+" and "−" are alternately arranged. That is, in a case of dot inversion driving, with respect to a row of switching elements 7 which are turned on by the same scan line X, different polarities are applied to neighboring pixels, whereby the liquid crystal material is driven, and the sequence of the polarities of pixels is inverted for neighboring scan lines X. Hereinafter, waveforms which are applied to the pixels will be described below as important requirements of this disclosure.

In FIG. 5, reference symbols G1, G2, G3, . . . , and Gn represent scan signals which are applied to the scan lines X1, X2, X3, . . . , and Xn, respectively. In a case where the scan signal are applied to the scan lines such that the switching elements 7 are turned on, display signals having positive and negative polarities are alternately applied to neighboring signal lines Y. A reference symbol Vcom represents the common electrode potential which is applied to the common electrode 19, and a reference symbol S represents the potential Vs of a pixel electrode 17. Two potentials from the bottom of FIG. 5 represent the potential of a pixel 5, which is on the scan line X1 and on which writing has been performed with positive polarity, and the potential of a pixel 5, which is on the scan line X2 and on which writing has been performed with negative polarity, and a voltage of |Vs−Vcom| is applied to the liquid crystal material 3 and is maintained.

Scanning is sequentially performed from the scan line X1, and if input of the scan signal Gn to the final scan line Xn is completed (the level of the scan signal Gn transitions from the high level to the low level), one vertical period is completed. Thereafter, in a vertical blanking period before the next vertical period starts, pulses having positive polarity and negative polarity are superimposed on the common electrode potential Vcom. Here, if the magnitude of the change of the common electrode potential Vcom due to the pulse superimposition is in a range from 1 V to 30 V, and the period of the change is in a range from 50 microseconds to 5 milliseconds, the change of the common electrode potential Vcom shows a remarkable effect, and if the magnitude of the change of the common electrode potential Vcom is in a range from 0.1 V to 20 V, and the period of the change is in a range from 10 microseconds to 3 milliseconds, the change of the common electrode potential Vcom shows an effect.

A voltage to be applied to a pixel 5, on which writing has been performed with positive polarity, becomes smaller than the voltage of |Vs−Vcom| applied before the pulse superimposition, due to one of the two pulses superimposed on the common electrode potential Vcom and having positive polarity (a broken line circle). Also, a voltage to be applied to a pixel 5 on which writing has been performed with negative polarity becomes smaller than the voltage of |Vs−Vcom| applied before the pulse superimposition, due to the pulse having the negative polarity (a broken line rectangle).

<Changing of Pixel Potential>

Figure 7:
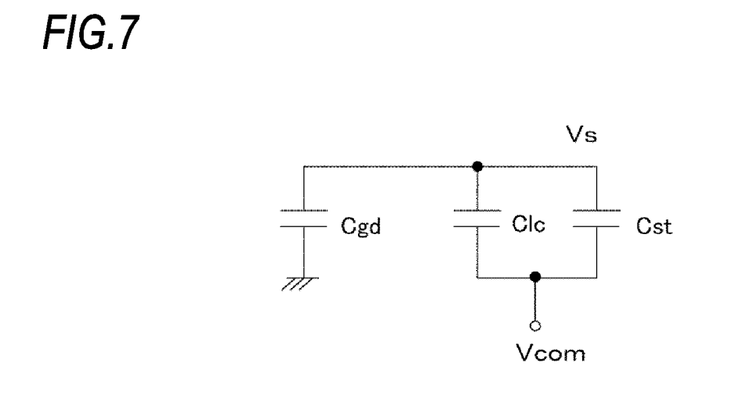
FIG. 7 is an equivalent circuit diagram of a pixel portion of the liquid crystal display according to the first embodiment of this disclosure.

The reason for changing the common electrode potential Vcom in a vertical blanking period and lowering each voltage to be applied to the liquid crystal material 3 will be described with reference to FIG. 7. FIG. 7 shows an equivalent circuit of a pixel 5 connected to a switching element (TFT) 7 which is in an OFF state since the scan signal level of a corresponding scan line X is at a low level. Here, a reference symbol Cgd represents a parasitic capacitor between the gate and drain of the TFT, and a reference symbol Clc represents the liquid crystal cell capacitor, and the reference symbol Cst is a storage capacitor for maintaining the voltage of the liquid crystal cell capacitor Clc.

If the common electrode potential Vcom to be applied to the common electrode 19 is changed by ΔVcom, the pixel potential varies by ΔVs which is obtained as follows.

$$\Delta Vs=(Clc+Cst)/(Clc+Cst+Cgd)\times \Delta Vcom$$

As a result, the voltage to be applied to the liquid crystal material 3 is changed to |Vs+ΔVs−(Vcom+ΔVcom)|(=|Vs−Vcom−Cgd/(Clc+Cst+Cgd)×ΔVcom|) by |Cgd/(Clc+Cst+Cgs)×ΔVcom|. This voltage is applied to the liquid crystal material 3.

As described above, with respect to each pixel 5, in a vertical blanking period, even if the common electrode potential Vcom is changed, whereby a voltage to be applied to the pixel is changed, since such period is very short period and the change in the voltage is slight, it does not affect display. If the common electrode potential Vcom is changed in the vertical blanking period, whereby the voltage becomes lower than that applied before the pulse superimposition, it is possible to remove a pressure mark in a short time without affecting display.

In the present embodiment, the pulse having positive polarity and the pulse having negative polarity are sequentially superimposed on the common electrode potential Vcom (FIG. 5). However, the superimposition sequence may be inversed. In this disclosure, it is important that the vertical blanking period includes a timing when the voltage to be applied to the pixel 5 becomes lower, and after that timing, even if the vertical blanking period includes a period where the voltage is high, the high voltage period does not affect the effect of removing the pressure mark.

Also, although dot inversion driving has been described as an example in the embodiment, even in horizontal line inversion driving, vertical line inversion driving, or frame inversion driving, if a period for applying a voltage lower than the writing voltage of a pixel 5 is set, it is possible to obtain the same effect.

As described above, with respect to each pixel 5, in a vertical blanking period, even if the common electrode potential Vcom is changed, whereby a voltage to be applied to the pixel is changed, since such period is very short period and the change in the voltage is slight, it does not affect display. If the common electrode potential Vcom is changed in the vertical blanking period, whereby the voltage becomes lower than that applied before the pulse superimposition, it is possible to remove a pressure mark in a short time without affecting display.

What is claimed is:

1. A lateral electric field type liquid crystal display comprising:
   an array substrate that includes: a plurality of signal lines and a plurality of scan lines arranged in a matrix to form pixel areas; switching elements formed corresponding to the intersections of the signal lines and the scan lines; pixel electrodes connected to the switching elements, and a common electrode formed to face the pixel electrodes with interposing an insulating film;
   a counter substrate that faces the array substrate; and
   a liquid crystal material that is interposed between the array substrate and the counter substrate,
   wherein the liquid crystal material responds to an electric field parallel to a surface of the array substrate, and
   wherein in a vertical blanking period, which is a blanking period of a vertical period for sequentially applying scan signals to all of the scan lines, a common electrode potential is changed so that a potential difference between the common electrode potential and the pixel electrode potential becomes smaller than that before the vertical blanking period.

2. The liquid crystal display according to claim 1,
   wherein the magnitude of the change of the common electrode potential Vcom is in a range from 1 V to 30 V, and the period of the change is in a range from 50 microseconds to 5 milliseconds.

3. The liquid crystal display according to claim 1,
   wherein the change of the common electrode potential Vcom is performed in the vertical blanking period such that:
   with respect to a pixel on which writing has been performed with positive polarity, the common electrode potential Vcom becomes higher than that before the vertical blanking period; and
   with respect to a pixel on which writing has performed with negative polarity, the common electrode potential Vcom becomes lower than that before the vertical blanking period.

4. The liquid crystal display according to claim 1
   wherein the change of the common electrode potential Vcom is performed in the vertical blanking period, such that the vertical blanking period includes a period, in which the common electrode potential Vcom becomes higher than that before the vertical blanking period, and a period, in which the common electrode potential Vcom becomes lower than that before vertical blanking period.

5. A driving method of a lateral electric field type liquid crystal display including: an array substrate that includes: a plurality of signal lines and a plurality of scan lines arranged in a matrix to form pixel areas; switching elements formed corresponding to the intersections of the signal lines and the scan lines; pixel electrodes connected to the switching elements, and a common electrode formed to face the pixel electrodes with interposing an insulating film; a counter substrate that faces the array substrate; and a liquid crystal material that is interposed between the array substrate and the counter substrate, wherein the liquid crystal material responds to an electric field parallel to a surface of the array substrate, the driving method comprising:
   changing, in a vertical blanking period, which is a blanking period of a vertical period for sequentially applying scan signals to all of the scan lines, a common electrode potential so that a potential difference between the common electrode potential and the pixel electrode potential becomes smaller than that before the vertical blanking period.

6. The driving method of the liquid crystal display according to claim 5,
   wherein the magnitude of the changing of the common electrode potential Vcom is in a range from 1 V to 30 V, and the period of the changing is in a range from 50 microseconds to 5 milliseconds.

7. The driving method of the liquid crystal display according to claim 5,
   wherein the changing of the common electrode potential Vcom is performed in the vertical blanking period such that:
   with respect to a pixel on which writing has been performed with positive polarity, the common electrode potential Vcom becomes higher than that before the vertical blanking period; and
   with respect to a pixel on which writing has performed with negative polarity, the common electrode potential Vcom becomes lower than that before the vertical blanking period.

8. The driving method of the liquid crystal display according to claim 5,
   wherein the changing of the common electrode potential Vcom is performed in the vertical blanking period, such that the vertical blanking period includes a period, in which the common electrode potential Vcom becomes higher than that before the vertical blanking period, and a period, in which the common electrode potential Vcom becomes lower than that before vertical blanking period.

* * * * *